United States Patent [19]

Sugioka et al.

[11] Patent Number: 4,905,794

[45] Date of Patent: Mar. 6, 1990

[54] LUBRICATING DEVICE IN TURRET TYPE CHANGE-OVER DEVICE

[75] Inventors: Takami Sugioka, Matsuyama; Toshihiro Yudate, Ehime, both of Japan

[73] Assignee: Teijin Seiki Company Limited, Osaka, Japan

[21] Appl. No.: 296,132

[22] Filed: Jan. 12, 1989

[30] Foreign Application Priority Data

Jan. 25, 1988 [JP] Japan ................................ 63-14331

[51] Int. Cl.$^4$ .............................................. F01M 9/10
[52] U.S. Cl. ................................. 184/6.15; 184/6.14; 384/465; 384/472
[58] Field of Search ................. 184/6.15, 6.14; 112/43, 112/256; 384/465, 472

[56] References Cited

U.S. PATENT DOCUMENTS 2,728,414 12/1955 Drissner ............................. 184/6.14
3,862,672 1/1975 Tappen et al. ..................... 184/6.12
4,704,039 11/1987 Ide ....................................... 384/465

*Primary Examiner*—Allen M. Ostrager
*Attorney, Agent, or Firm*—Lane & Aitken

[57] ABSTRACT

A lubricating device of a turret type change-over device wherein a plurality of rotating bodies are mounted on a rotatable turret table, comprising: a plurality of bearings adapted to rotate the rotating bodies with respect to the rotatable turret table; a lubricating oil chamber provided in the vicinity of the bearings; and a lubricating oil tank provided within the lubricating oil chamber, the oil tank being rotated in accordance with the rotation of the turret table to retain a lubricating oil therein and supply the same to the bearings.

7 Claims, 7 Drawing Sheets

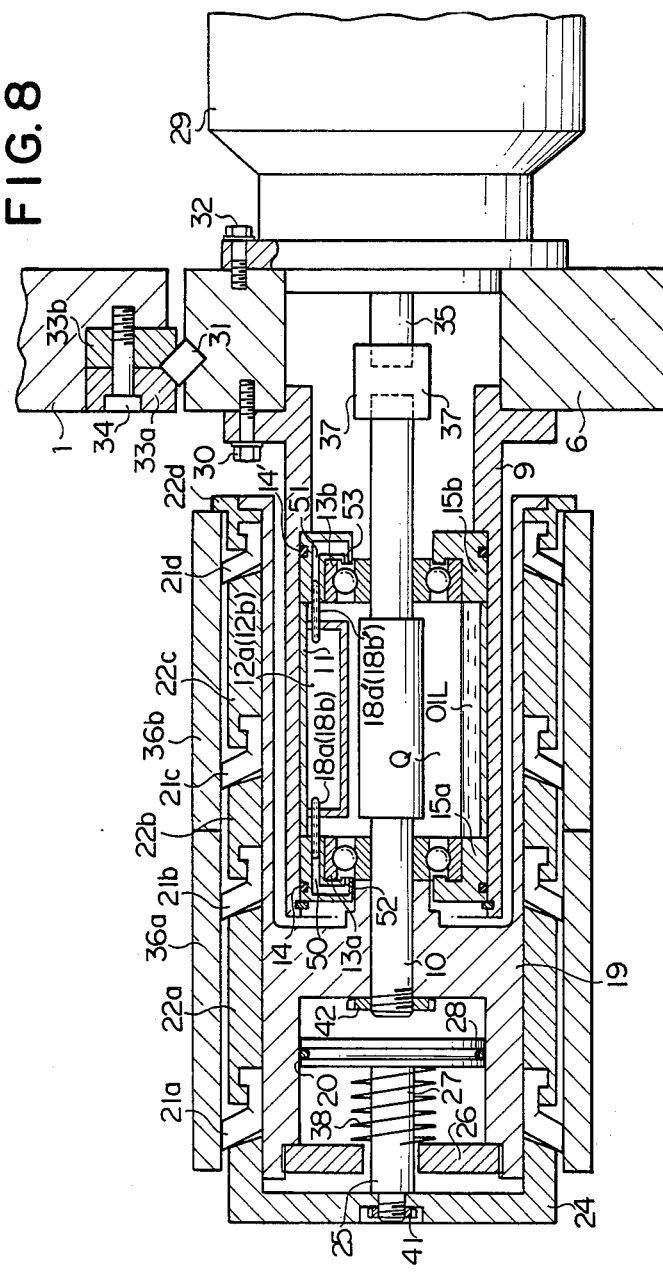

LUBRICATING DEVICE IN TURRET TYPE CHANGE-OVER DEVICE

FIELD OF THE INVENTION

The present invention relates to a lubricating device in a turret type change-over device.

DESCRIPTION OF THE PRIOR ART

There are the following lubrication methods of bearings which have so far been normally applied to a turret type change-over device having rotating bodies such as bobbin holders, i.e., grease lubrication, oil mist lubrication wherein a nozzle splashes a fine spray of oil and air on to bearings, and oil-air lubrication wherein a nozzle splashes oil and air alternately on to bearings.

However, the conventional grease lubrication cannot be used where high speeds occur. In the oil mist lubrication and the oil-air lubrication, it is required to feed the mixture of a fine spray of oil and air or the mixture of oil and air to the rotating table of a winding device, and therefore rotary joints, piping and the like are needed. For this reason, the device becomes structurally complex and costly. The conventional device has also its disadvantage in that the running cost is increased, since compressed air is employed for the supply of lubricating oil, and lubricating oil is thrown away after use.

It is accordingly an object of the present invention to provide an improved lubricating device of rotating bodies such as bobbin holders which eliminates and overcomes the drawbacks as are produced by the conventional lubricating methods and wherein the running cost is decreased.

SUMMARY OF THE INVENTION

In accordance with one important aspect of the present invention, there is provided a lubricating device of a turret type change-over device wherein a plurality of rotating bodies are mounted on a rotatable turret table, comprising: a plurality of bearings adapted to rotate the rotating bodies with respect to the rotatable turret table; a lubricating oil chamber provided in the vicinity of the bearings; and a lubricating oil tank provided within the lubricating oil chamber, the oil tank being rotated in accordance with the rotation of the turret table to retain an lubricating oil therein and supply the same to the bearings.

The turret type change-over device may comprise a turret type automatic yarn change-over winding device, and the rotating bodies may comprise a plurality of bobbin holders.

The rotating bodies may comprise drive motors.

The turret type change-over device may comprise a turret type metal cutting device, and the rotating bodies may comprise a plurality of spindles for tools.

In accordance with another important aspect of the present invention, there is provided a lubricating device of a turret type change-over device which comprises a rotatable turret table, a cylindrical support mounted on the turret table, a drive shaft extending through the support and rotatable with respect to the table, a pair of axially spaced bearings provided between the drive shaft and cylindrical support, and a rotatable body mounted on the drive shaft, comprising: a lubricating oil chamber defined by the cylindrical support and the bearings; a pair of lubricating oil tanks symmetrically mounted on the cylindrical-support between the bearings, one of the oil tanks being rotated in accordance with the rotation of the turret table to retain an lubricating oil therein and supply the same to the bearings.

The lubricating device may further comprise a pair of oil receivers mounted on the drive shaft in the vicinity of the bearings, each of the receivers being connected with the oil tanks and formed with a passage through which the lubricating oil is supplied to the bearings while the rotatable body is rotating.

BRIEF DESCRIPTION OF THE DRAWINGS

The above and other objects and advantages will become apparent from the following detailed description when read in conjunction with the accompanying drawings wherein:

FIG. 8 is a sectional view taken substantially along line D—D of FIG. 7.

DESCRIPTION OF THE PREFERRED EMBODIMENTS

Referring now in greater detail to the drawings and initially to FIGS. 1 through 4, there is shown a first embodiment of a lubricating device of a bobbin holder in a turret type automatic change-over winding device which is constructed in accordance with the present invention.

Figure 1:
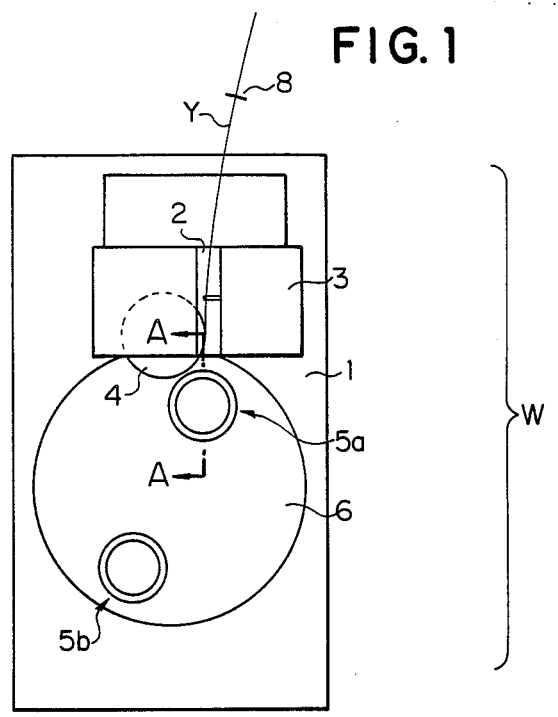
FIG. 1 is a front view, generally schematic in form, showing a winding device in which a first embodiment of the present invention is incorporated.
Figure 2:
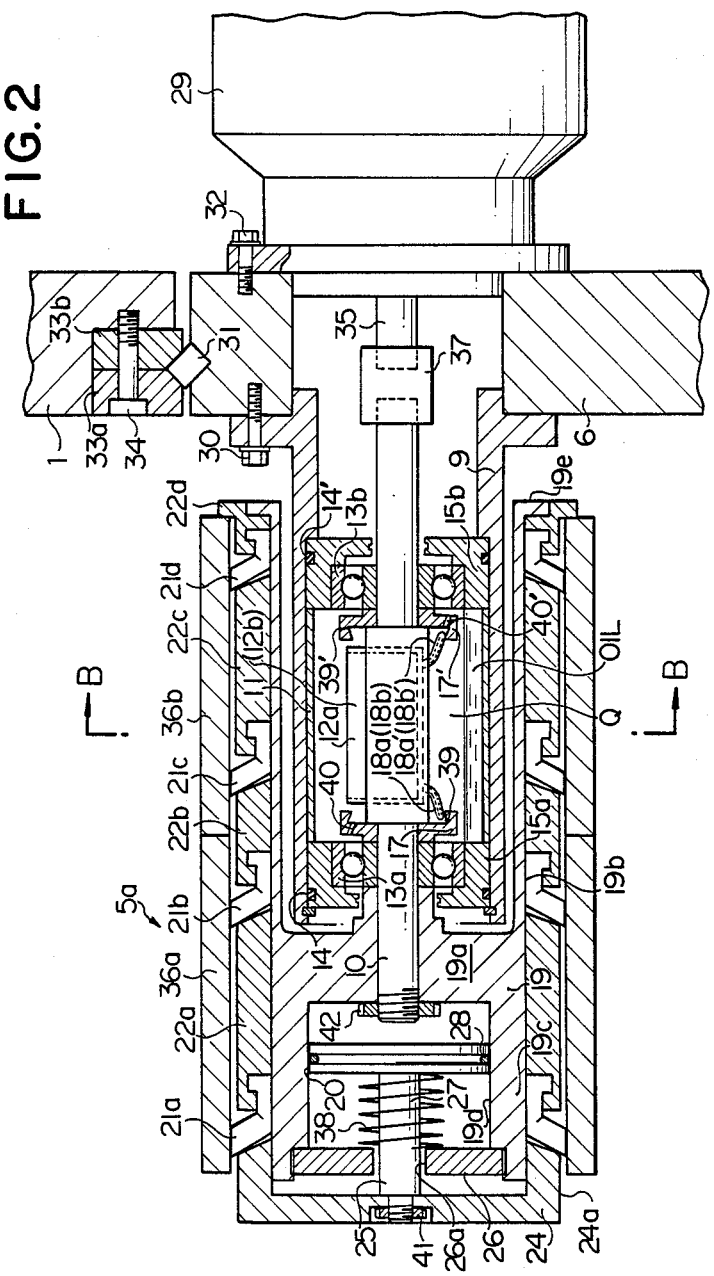
FIG. 2 is a longitudinal sectional view taken substantially along line A—A of FIG. 1.
Figure 3:
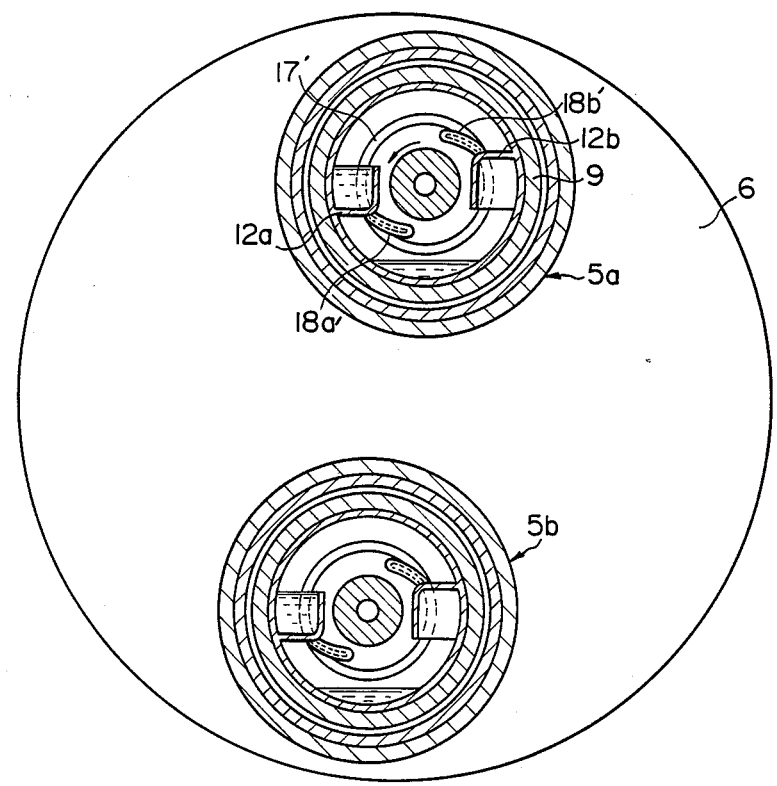
FIG. 3 is a cross sectional view taken substantially along line B—B of FIG. 2.

In FIG. 1, a yarn Y passes through a snail guide 8 which becomes the fulcrum of traverse, and is wound by a winding device W.

The winding device W comprises a traversing yarn guide 3 for traversing the yarn Y, and a contact roller 4 which is mounted on a sliding block 2 and raised and lowered through a guide shaft (not shown) with respect to a frame structure 1. A table 6 having two bobbin holders 5a and 5b rotatably mounted thereon is rotatably supported through a bearing 31 (FIG. 2) on the frame structure 1. The bearing 31 is supported by the table 6 and members 33a and 33b which are secured to the frame structure 1 by a bolt 34. A hollow cylindrical support 9 is fixed to the table 6 by a bolt 30 and extends axially outward therefrom. On the inner surface of the hollow cylindrical support 9 is rotatably supported a drive shaft 10 through outer and inner bearings 13a and 13b and outer and inner housings 15a and 15b. The drive shaft 10 extends through the hollow cylindrical support 9 and projects axially outward from the support 9. The drive shaft 10 is connected at its axially inner end with a motor shaft 35 through a coupling 37 and driven to rotate about its own axis by a motor 29 which is mounted on the table 6 by a bolt 32. On the axially outer end of the drive shaft 10 is mounted the boss portion 19a of a cylindrical bobbin holder 19 by a nut 42 in such a manner that the holder 19 is rotatable with the drive shaft 10. The cylindrical bobbin holder 19 has an axially inner cylindrical portion 19b extending axially inward from the boss portion 19a so as to surround the cylindrical support 9 and an axially outer cylindrical portion 19c extending axially outward from the axially inner cylindrical portion 19b. The axially outer portion 19c of the bobbin holder 19 is formed with a cylinder portion 19d on which a piston 20 is slidably received. The piston 20 is connected with a piston rod 27 extending axially outward therefrom and through the central bore 26a of a cover plate 26 which is received on the outer end of the bobbin holder 19 to close the cylinder portion 19d. Between the cover plate 26 and the piston 20 there is provided a spring 38 for urging the piston 20 and piston rod 27 in the axially inward direction. The piston rod 27 has an end plate 24 mounted on the outer end thereof by a nut 41, and the end plate 24 has an axially inner annular flange portion 24a which is received on the axially outer portion 19c of the bobbin holder 19. Between the annular flange portion 24a of the end plate 24 and an flange portion 19e formed in the axially inner end of the cylindrical bobbin holder 19, there are interposed a first elastic body 21a and a first sleeve 22a which are received on the axially outer portion 19c of the bobbin holder 19, and a second elastic body 21b, a second sleeve 22b, a third elastic body 21c, a third sleeve 22c, a fourth elastic body 21d and a fourth sleeve 22d which are received on the axially inner portion 19b of the bobbin holder 19. An outer bobbin 36a and an inner bobbin 36b are received on the leg portions of the elastic bodies extending radially outward. As stated above, the end plate 24 is urged in the axially inward direction by means of the spring 38, and therefore the first elastic body 21a, first sleeve 22a, second elastic body 21b, second sleeve 22b, the third elastic body 21c, third sleeve 22c, fourth elastic body 21d and fourth sleeve 22d are caused to compress in the axially inward direction and the elastic bodies 21a, 21b, 21c and 21d enlarge in the radial direction substantially perpendicular to the axially inward direction so that the bobbins 36a and 36b are retained.

A lubricating oil chamber Q is provided between the bearings 13a and 13b and defined by the housing 15a with an O-ring 14, housing 15b with an O-ring 14' and a tubular member 11 received on the inner surface of the cylindrical support 9 between the housings 15a and 15b. Lubricating oil tanks 12a and 12b are symmetrically disposed with respect to the drive shaft 10 and fixedly mounted on the tubular member 11. For example, in the condition shown in FIG. 3, when the table 6 is fixed, one lubricating oil tank 12a retains lubricating oil therein, and the other lubricating oil tank 12b discharges lubricating oil therefrom. In this embodiment, the quantity of lubricating oil in the lubricating oil chamber Q is slightly more than the total lubricating oil capacity of the lubricating oil tanks 12a and 12b. As clearly shown in FIG. 3, the bottom portions of the lubricating oil tanks 12a and 12b are respectively connected with lubricating oil pipes 18a' and 18b' which supply the lubricating oil to an rear lubricating oil receiver 17' fixedly mounted on the drive shaft 10 in the vicinity of the rear bearing 13b. Likewise, the bottom portions of the lubricating oil tanks 12a and 12b are respectively connected with lubricating oil pipes 18a and 18b which supply the lubricating oil to an front lubricating oil receiver 17 fixedly mounted on the drive shaft 10 in the vicinity of the front bearing 13a. The rear lubricating oil receiver 17' has an oil receiving portion 39' for receiving the lubricating oil supplied from the lubricating oil tanks 12a and 12b, and is formed with an oil passage 40' through which the lubricating oil in the oil receiving portion 39' is supplied to the rear bearing 13b by the centrifugal force resulting the rotation of the bobbin holder 5a. Likewise, the front oil receiver 17a has an oil receiving portion 39 for receiving the lubricating oil supplied from the lubricating oil tanks 12a and 12b, and is formed with an oil passage 40 through which the lubricating oil in the oil receiving portion 39 is supplied to the front bearing 13a.

The lower bobbin holder 5b is also supplied with the lubricating oil in the same manner as described above. While the upper bobbin holder 5a is rotating about its own axis to wind the yarn Y thereon, the lubricating oil in the oil receiver of the lower bobbin holder overflows and drops therefrom in the lubricating oil chamber Q, since the lower bobbin holder 5b does not rotate.

When the yarn Y wound on the bobbin holder 5a reaches a predetermined amount, the lower bobbin holder 5b is driven to rotate about its own axis by the motor 29. At this time, the bearings are supplied with the lubricating oil due to the centrifugal force applied to the oil receivers, as described above.

Figure 4:
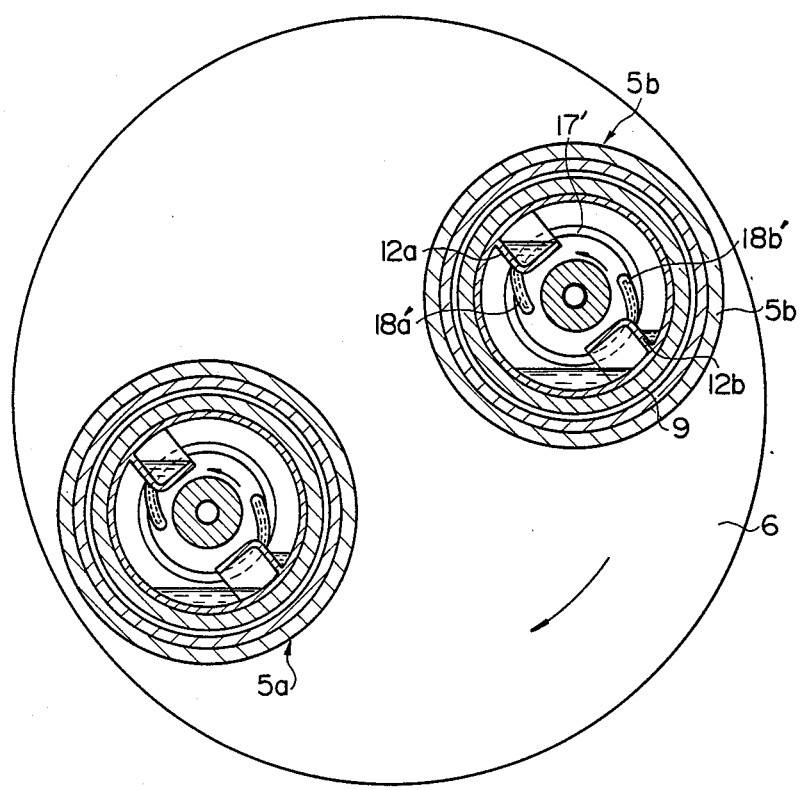
FIG. 4 is a view similar to FIG. 3 showing that the table is rotating from the position of FIG. 3 to change the upper bobbin holder to the lower bobbin holder.

After the yarn Y wound on the lower bobbin holder 5b reached a predetermined amount, a stop pin (not shown) for fixing the table 6 is removed from the table 6, and the table 6 is rotated by suitable drive means (not shown). If the table 6 starts rotating, the remaining lubricating oil in the lubricating oil tank 12a drops in the lubricating oil chamber Q, as shown in FIG. 4. Thereafter, the lubricating oil in the lubricating oil chamber Q is retained in the lubricating oil tank 12b, and the positions of the bobbin holders 5a and 5b are changed. The lubricating oil retained in the lubricating oil tank 12b is supplied to the bearings in the same manner as described above.

While in the aforesaid embodiment the bearings of the bobbin holder are disposed inside the bobbin support, it is noted that the bearings may be disposed inside the table.

Figure 5:
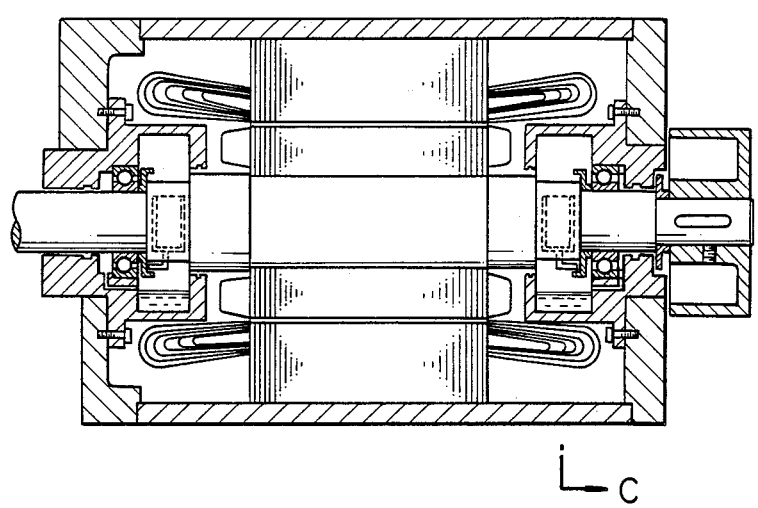
FIG. 5 is a longitudinal sectional view showing a lubricating device of a drive motor for bobbin holders which is constructed in accordance with a second embodiment of the present invention.
Figure 6:
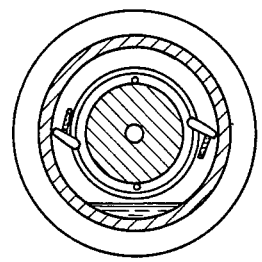
FIG. 6 is a cross sectional view taken substantially along line C—C of FIG. 5.

Referring to FIGS. 5 and 6, there is shown another embodiment of the present invention. The present invention is applied to a drive motor for a rotating body (for example, a bobbin holder) which is mounted on a turret table used in a turret type change-over device (for example, a yarn automatic change-over winding device). The detailed description of this embodiment will hereinafter be omitted. Also, the present invention is applicable to a metal cutting device having a turret table for changing tools.

Figure 7:
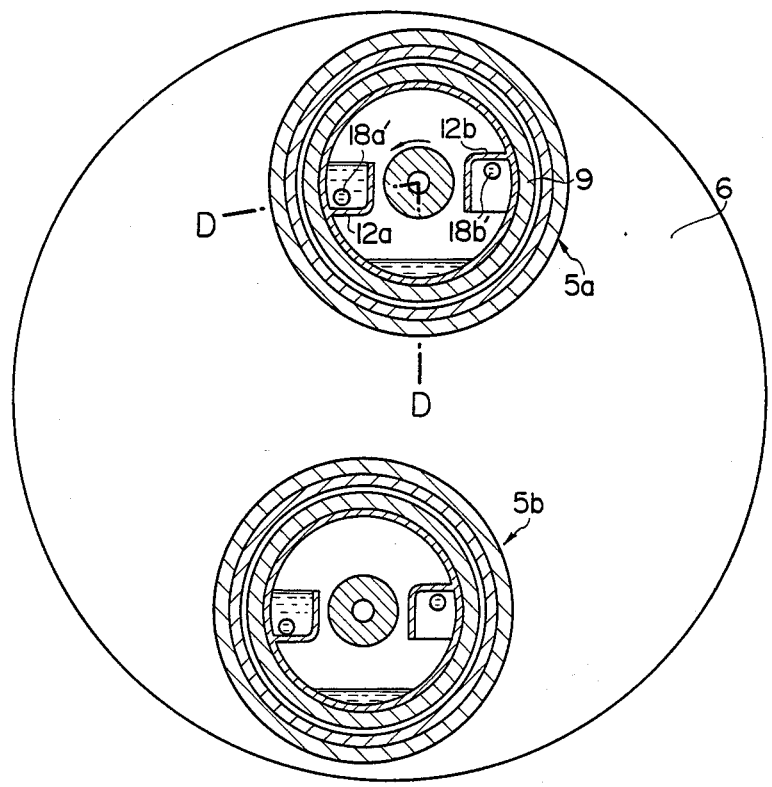
FIG. 7 is a cross sectional view of a third embodiment of the present invention.

While, in the aforesaid embodiment of FIGS. 1 through 4, the lubricating oil in the lubricating oil tank is supplied through the oil pipes to the lubricating oil receiver and then supplied to the bearings by the centrifugal force, it is noted that the lubricating oil may be suppled directly to the bearings through the oil pipes. For example, in the embodiment shown in FIGS. 7 and 8, the lubricating oil in the lubricating oil tank is supplied directly to the bearings through the oil pipes. The members and parts substantially identical to those of the first embodiment shown in FIGS. 1 through 4 are designated by like reference numerals for avoiding the description. The lubricating oil tank 12a is provided at the bottom portion thereof with the oil pipes 18a and 18a' to supply the lubricating oil in the lubricating oil tank 12a directly to the housings 15a and 15b. Likewise, the lubricating oil tank 12b is provided at the bottom portion thereof with the oil pipes 18b and 18b' to supply the lubricating oil in the lubricating oil tank 12b directly to the housings 15a and 15b. The housings 15a and 15b are respectively provided with generally L-shaped oil passages 50 and 51 through which the lubricating oil from the oil pipes 18a and 18a' (18b, 18b') passes, and the lubricating oil supplied to the passages 50 and 51 is supplied to the bearings 13a and 13b through bores 52 and 53 which were connected with the passages 50 and 51 due to the potential head.

From the foregoing description, it will be seen that the lubrication device according to the present invention is not costly, since it does not need the mixing device of oil and air, pipings and rotary joints which are used in the conventional oil mist lubrication and oil-air lubrication. The lubrication device of the present invention has its advantage in that the running cost is decreased, since compressed air for feeding oil is not needed and the lubricating oil can be circulated and used.

While certain representative embodiments and details have been shown for the purpose of illustrating the invention, it will be apparent to those skilled in this art that various changes and modifications may be made therein without departing from the scope of the invention.

What we claim is:

1. A lubricating device of a turret type change-over device wherein a plurality of rotating bodies are mounted on a rotatable turret table, comprising:
   a plurality of bearings adapted to rotate said rotating bodies with respect to said rotatable turret table;
   a lubricating oil chamber provided in the vicinity of said bearings; and
   a lubricating oil tank provided within said lubricating oil chamber, the oil tank being rotated in accordance with the rotation of said turret table to retain a lubricating oil therein and supply the same to said bearings.

2. A lubricating device as set froth in claim 1, wherein said turret type change-over device comprises a turret type automatic yarn change-over winding device, and said rotating bodies comprise a plurality of bobbin holders.

3. A lubricating device as set froth in claim 1, wherein said rotating bodies comprise drive motors.

4. A lubricating device as set froth in claim 1, wherein said turret type change-over device comprises a turret type metal cutting device, and said rotating bodies comprise a plurality of spindles for tools.

5. A lubricating device of a turret type change-over device which comprises a rotatable turret table, a cylindrical support mounted on said turret table, a drive shaft extending through said support and rotatable with respect to said table, a pair of axially spaced bearings provided between said drive shaft and cylindrical support, and a rotatable body mounted on said drive shaft, comprising:
   a lubricating oil chamber defined by said cylindrical support and said bearings;
   a pair of lubricating oil tanks symmetrically mounted on said cylindrical support between said bearings, one of said oil tanks being rotated in accordance with the rotation of said turret table to retain an lubricating oil therein and supply the same to said bearings.

6. A lubricating device as set forth in claim 5, which further comprises a pair of oil receivers mounted on said drive shaft in the vicinity of said bearings, each of the receivers being connected with said oil tanks and formed with a passage through which said lubricating oil is suppled to said bearings while said rotatable body is rotating.

7. A lubricating device as set forth in claim 5, wherein said rotatable body comprises a bobbin holder of a winding device.

* * * * *